Jan. 7, 1969 G. W. HASLETT, JR 3,420,419
TANK FOR STORING AND TRANSPORTING DRY OR LIQUID MATERIAL
Filed May 29, 1967 Sheet 1 of 2
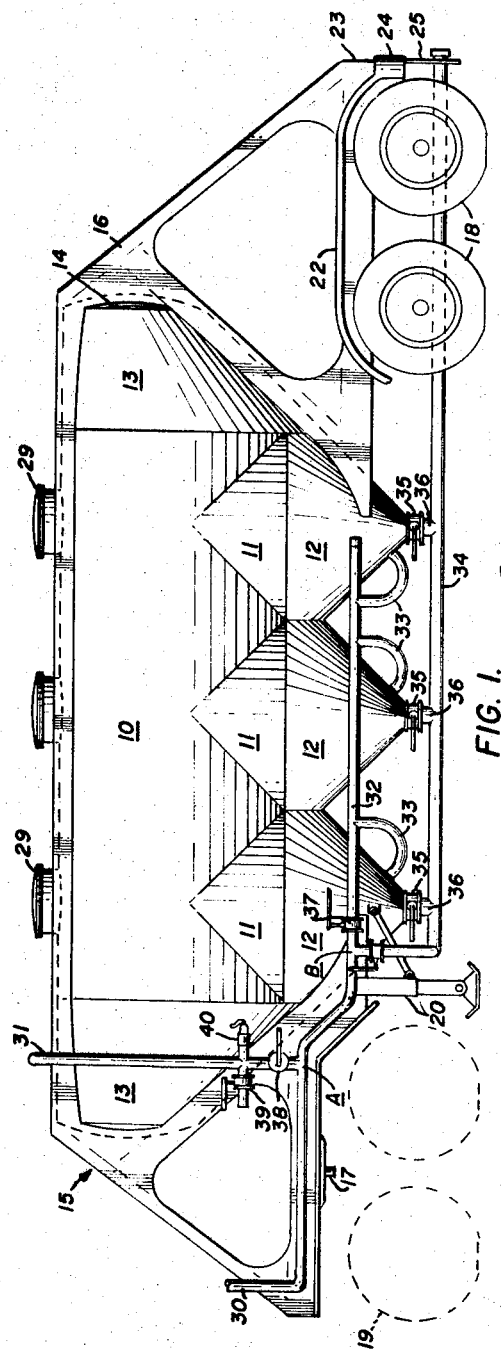
GERALD W. HASLETT, Jr.
INVENTOR.
BY
ATTORNEY

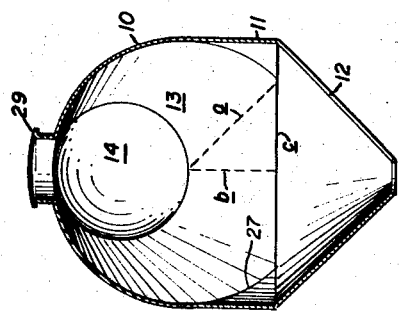
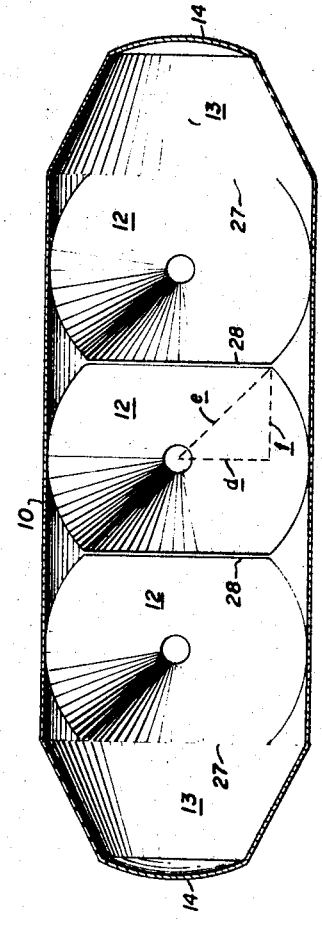
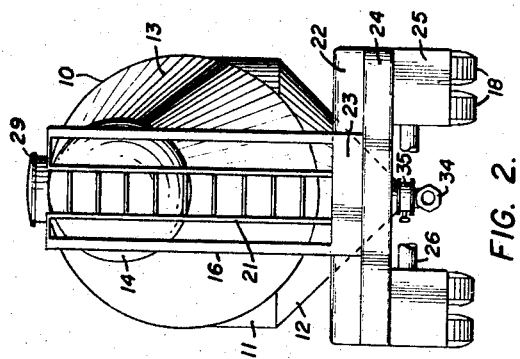

United States Patent Office 3,420,419
Patented Jan. 7, 1969

3,420,419
TANK FOR STORING AND TRANSPORTING DRY OR LIQUID MATERIAL
Gerald W. Haslett, Jr., Saginaw, Tex., assignor to J & L Tank, Inc., Saginaw, Tex., a corporation of Texas
Filed May 29, 1967, Ser. No. 642,099
U.S. Cl. 222—544          3 Claims
Int. Cl. B65d 47/06; B61d 7/02

ABSTRACT OF THE DISCLOSURE

A pneumatically discharged tank for transporting dry or liquid material comprising a horizontal cylindrical tank shell, one or more vertical cylindrical transition sections along the bottom of the main shell, each transition section supporting a 45° discharge cone, the ends of the main tank comprising oblique truncated cones, horizontal along the top and sloping 45° on the bottom, the bottom of said oblique cones fairing into the sides of the adjoining 45° discharge cones, and the diameter of said cylindrical transition section being equal to the diameter of the horizontal tank shell.

---

This invention relates to tanks for transporting or storing dry or liquid materials, and which tank may be discharged by gravity or pneumatic pressure.

An object of the invention is to provide a tank of the described class having a high strength-weight ratio, that is, one which is relatively light yet unusually strong for its size.

Another object of the invention is to provide a tank for transportation or storage of materials so constructed that there are no voids, flat areas, non-circular slope sheets or transition portions within the shell.

Another object is to provide a tank as referred to wherein the sides of the transition section are tangent to the sides of the shell whereby increased capacity is attained as compared with conventional tanks of the same over all dimensions.

These and other objects of the invention will become apparent from the following description and the accompanying drawings, wherein:

FIGURE 1 is a side elevational view of a tank trailer in accordance with the invention.

FIGURE 2 is a rear end view of FIGURE 1.

FIGURE 3 is a vertical longitudinal sectional view of the tank illustrated in FIGURE 1, and additionally showing, by dotted lines, that the tank may be of various lengths according to the number of transition sections and discharge cones employed.

FIGURE 4 is a sectional view taken on line 4—4 of FIGURE 3, and

FIGURE 5 is a sectional view taken on line 5—5 of FIGURE 3.

In the drawings the numeral 10 designates a cylindrical shell having depending cylindrical transition sections 11 and discharge cones 12 therebeneath. In the form of the invention shown there are front and rear end oblique cones 13 on the ends of the shell 10, and which cones are truncated where they are provided with dished closures or heads 14. As will become apparent the thus far described components provide a tank assembly which does not have internal obstructions and thereby provides free flow of material when discharged from the discharge cones.

The described tank is supported in a trailer frame 15 which includes parallel longitudinal frame members 16 shaped to receive the tank and to provide a mounting for a kingpin 17 at the front end and a running gear, not shown, for wheels 18 at the rear end. The rear wheels 19 of a tractor are shown by dotted lines. A conventional landing gear 20 for supporting the forward end of the frame 15 is shown in FIGURE 1, and a ladder 21 between the frame members 16 at the end of the frame is shown in FIGURE 2. Other details of the trailer include fenders 22, cross member 23, bumper 24, mud guards 25 and an axle 26.

Referring now to the details of the tank, the shell 10 and the transition sections 11 are both circular in cross section and are of the same diameter, thus their intersections are at forty-five degrees as viewed perpendicularly from either side of the shell. It also follows that the apexes of the transition sections are tangent with the sides of the shell 10. To determine the height of each transition section 11, a line $a$ (FIGURE 5) is drawn at forty-five degrees with reference to a center vertical line $b$, from the transverse section center of the shell 10 to the circumference of the latter. The bottom of the transition section is determined by a horizontal line $c$ drawn through the point of intersection.

Where more than one transition section 11 and discharge cone 12 are employed, as in the present drawings, the discharge cones do not define complete circles as best shown in FIGURE 4. Here a transverse line $d$ is drawn through the cones 12 and a line $e$ is drawn at forty-five degrees from the center of the cone through the cone periphery. The point of intersection, and three other similarly located points of intersection, determine the widths of the front and rear edges 27 and 28 of the respective cones 12. In FIGURE 4 the dotted line $f$ merely shows the remaining leg of a forty-five degree triangle defined by dotted lines $d$ and $e$.

As best shown in FIGURE 3, the oblique end cones 13 on the ends of the shell 10 are horizontal along their upper sides and are in line with the upper horizontal side of the shell, whereas the lower sides of the end cones are in line with the front side of the first discharge cone 11 and the rear side of the last discharge cone. In the top of the shell 10 and above the center of each discharge cone 11 there is a filler opening and removable cap 29.

The pneumatic system shown in FIGURE 1 is typical and includes an air supply line 30 which branches at A where it connects with a top air line 31 and with an aeration line 32 extending along one side of the discharge cones 11. The top air line 31 connects with the top of the tank, whereas the aeration line 32 communicates with each discharge cone 22 near the bottom thereof by means of hose connections 33. Connected with the aeration line 32, at B, forwardly of the first hose connection 33, and extending beneath each discharge cone 11 and rearwardly of the end of the trailer, there is a product discharge line 34. Manual valves 35 and branch lines 36 connect the product discharge line 34 with the various discharge cones 11 which are open at their apex ends. Between its connection with the product discharge line 34 and its connection with the first hose connection 33, the aeration line 32 has a valve 37 for selectively aerating the product in the discharge cones 11 to prevent packing. In the top air line 31, above its connection A with the air inlet line 30, there is a valve 38 for closing or adjusting the amount of air delivered to the top of the tank. Also in the top air line 31, and above the last mentioned valve 38, there is a blow down valve 39, that is, one that opens to atmosphere. Similarly, there is a pressure relief valve 40 in the top air line 31 for relieving excess pressure in the top of the tank.

In view of the foregoing, it is apparent that the described tank, intended primarily for handling pulverulent material such as dry cement, has a high strength-weight ratio, does not require internal baffles, does not have voids which are likely to fill with the material being handled and not discharged, and a design which does not require intricate calculations in its layout.

What is claimed is:

1. A tank for receiving and discharging fluid materials including loose bulk products, a horizontal cylindrical shell, at least one vertically disposed cylindrical transition section beneath said shell and in completely open communication therewith, the diameter of said transition section being equal to the diameter of said shell, an open inverted forty-five degree discharge cone connected with the depending periphery of said transition section, and means selectively opening and closing the opening of said discharge cone.

2. A tank as defined in claim 1 and wherein the closed ends of said shell are oblique cones, the upper surfaces of said oblique cones being horizontal and in line with the upper surface of said shell, and wherein the lower surfaces of said oblique cones are in line with the opposite surfaces of a said discharge cone.

3. A tank as defined in claim 1 and wherein the length of said transition section is defined by a forty-five degree line through the transverse center of said shell and intersecting its circumference, the length of said transition section being the distance from said center to a horizontal line through the intersection of said forty-five degree line and said circumference.

References Cited

UNITED STATES PATENTS

| | | | |
|---|---|---|---|
| 1,274,614 | 8/1918 | Sherman | 105—248 |
| 2,108,416 | 2/1938 | Smith et al. | 214—83.28 |
| 2,901,133 | 8/1959 | Weller | 214—83.28 |

FOREIGN PATENTS 433,417  8/1926  Germany.

SAMUEL F. COLEMAN, *Primary Examiner.*

U.S. Cl. X.R.

105—248, 360